US006609536B2

(12) United States Patent
Chen

(10) Patent No.: US 6,609,536 B2
(45) Date of Patent: Aug. 26, 2003

(54) DEPRESSION CAP FOR A BOTTLE

(76) Inventor: Jen-Fu Chen, No.835, Yuan Huan East Road, Feng Yuan City, Taichung Hsien (TW)

( * ) Notice: Subject to any disclaimer, the term of this patent is extended or adjusted under 35 U.S.C. 154(b) by 147 days.

(21) Appl. No.: 09/939,615

(22) Filed: Aug. 28, 2001

(65) Prior Publication Data

US 2003/0047219 A1 Mar. 13, 2003

(51) Int. Cl.[7] ............................................... G05D 16/20
(52) U.S. Cl. ..................... 137/565.23; 141/65
(58) Field of Search ..................... 137/565.23; 141/65

(56) References Cited

U.S. PATENT DOCUMENTS 4,899,896 A  *  2/1990  Metzger ..................... 215/228
5,535,900 A  *  7/1996  Huang ....................... 141/65 X
5,806,575 A  *  9/1998  Tsay ........................... 141/65
6,202,714 B1  *  3/2001  Wang ......................... 141/329
6,470,924 B2  * 10/2002  Chen .......................... 141/65

* cited by examiner

Primary Examiner—Kevin Lee
(74) Attorney, Agent, or Firm—Rosenberg, Klein & Lee

(57) ABSTRACT

A depression cap comprises a first end and a second end, the second end having a compartment defined therein for engaging with a nose of a bottle. An air pump is provided for drawing air out of the bottle. A pressure-activated switch is provided for controlling on/off of the air pump. The pressure-activated switch is capable of detecting an internal pressure in the bottle. The air pump is turned on when the internal pressure is higher than a predetermined first pressure value. The air pump is turned off when the internal pressure is lower than a predetermined second pressure value that is smaller than the predetermined first pressure value.

19 Claims, 7 Drawing Sheets

DEPRESSION CAP FOR A BOTTLE

BACKGROUND OF THE INVENTION

1. Field of the Invention

The present invention relates to a depression cap for a bottle such as a wine bottle, the depression cap being capable of maintaining the internal pressure of the bottle under a predetermined value. In particular, the present invention relates to a depression cap that is mounted to a bottle and equipped with an air pump that can be activated when the internal pressure in the bottle is below a predetermined value.

2. Description of the Related Art

It has been found that a little wine may help with the blood circulation of human being and it is common to use the original cap or cork to reseal the wine bottle that still has wine left inside. However, the sealing effect of the cap or cork was found unsatisfactory such that air leaks into the bottle and causes deterioration of the wine. In addition, the cork might be expelled from the bottle when the interior pressure in the bottle exceeds a certain value.

SUMMARY OF THE INVENTION

It is a primary object of the present invention to provide a depression cap that may automatically draw air out of a bottle after the depression cap is mounted to the bottle. The internal pressure of the bottle is reduced to a predetermined value.

In accordance with a first aspect of the invention, a depression cap comprises a first end and a second end, the second end having a compartment defined therein for engaging with a nose of a bottle. An air pump is provided for drawing air out of the bottle. A pressure-activated switch is provided for controlling on/off of the air pump. The pressure-activated switch is capable of detecting an internal pressure in the bottle. The air pump is turned on when the internal pressure is higher than a predetermined first pressure value, and the air pump is turned off when the internal pressure is lower than a predetermined second pressure value that is smaller than the predetermined first pressure value.

In accordance with a second aspect of the invention, a depression cap comprises a first end and a second end, the second end having a compartment defined therein for engaging with a nose of a bottle. An air pump is provided for drawing air out of the bottle. A pressure-activated switch is provided for controlling on/off of the air pump. The pressure-activated switch detects a pressure difference resulting from a closing motion of the depression cap onto the nose of the bottle and turns the air pump on to thereby draw air out of the bottle. The air pump is turned off when an internal pressure in the bottle detected by the pressure-activated switch is lower than a predetermined pressure value.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
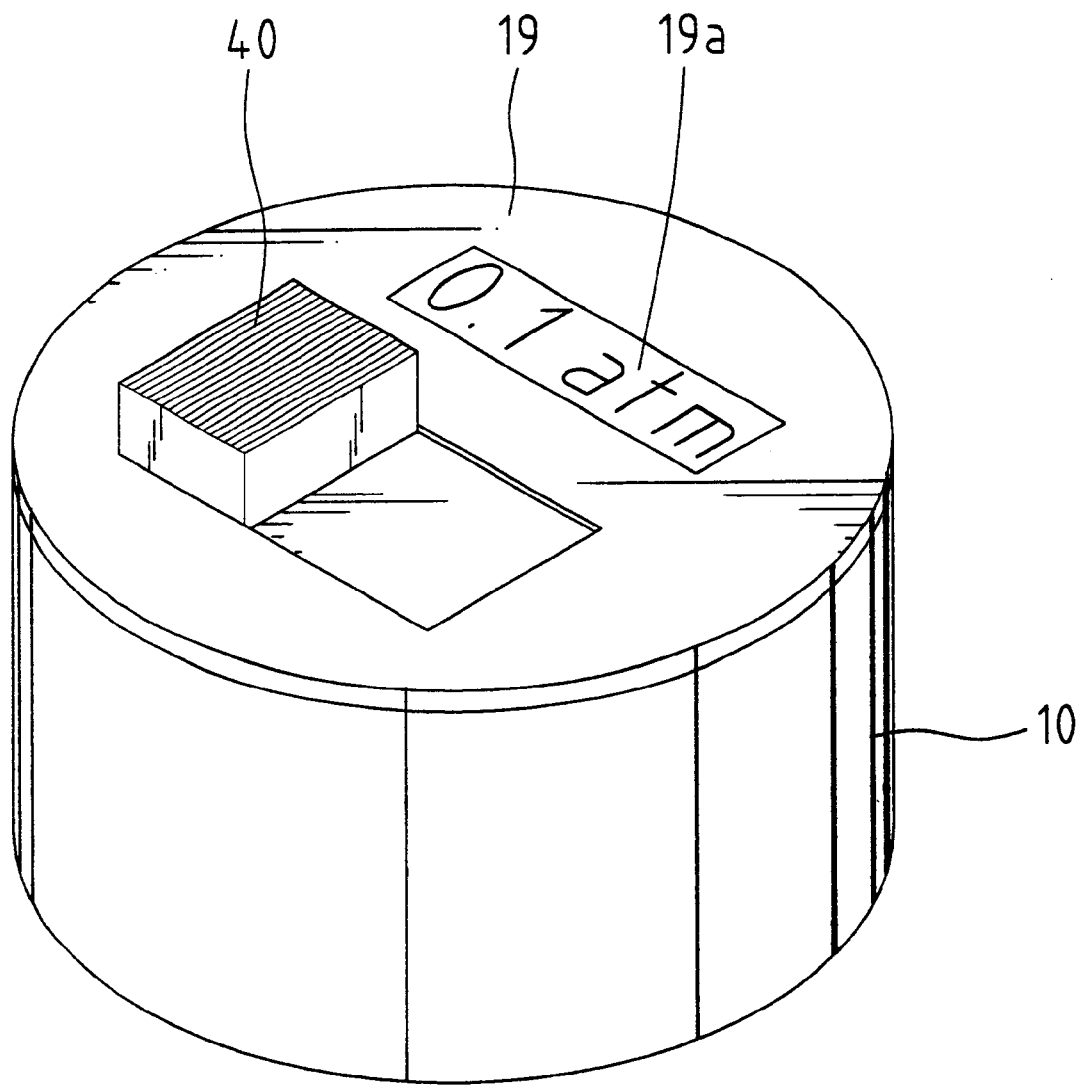
FIG. 1 is a perspective view of a depression cap for a bottle in accordance with the present invention.
Figure 2:
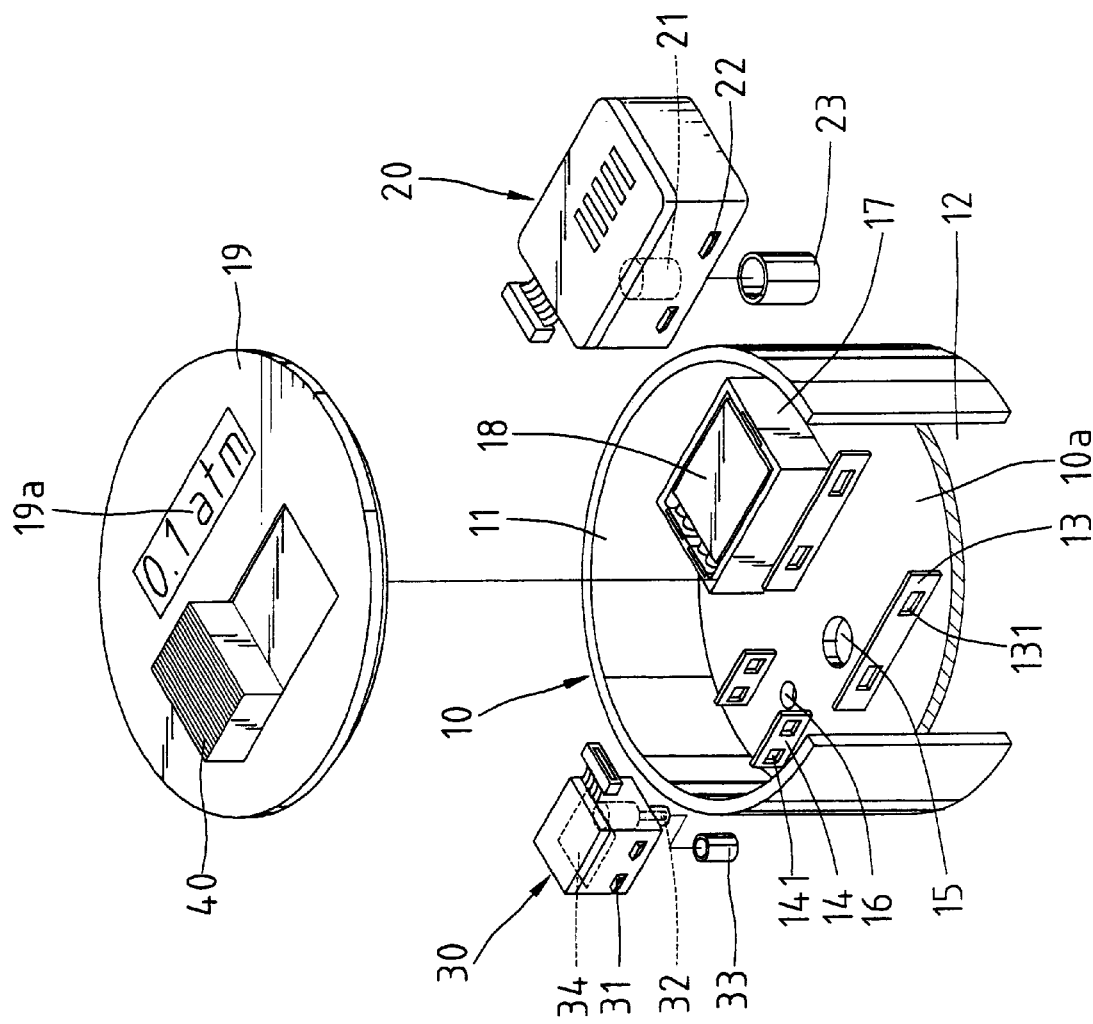
FIG. 2 is an exploded perspective view of the depression cap for a bottle in accordance with the present invention.
Figure 3:
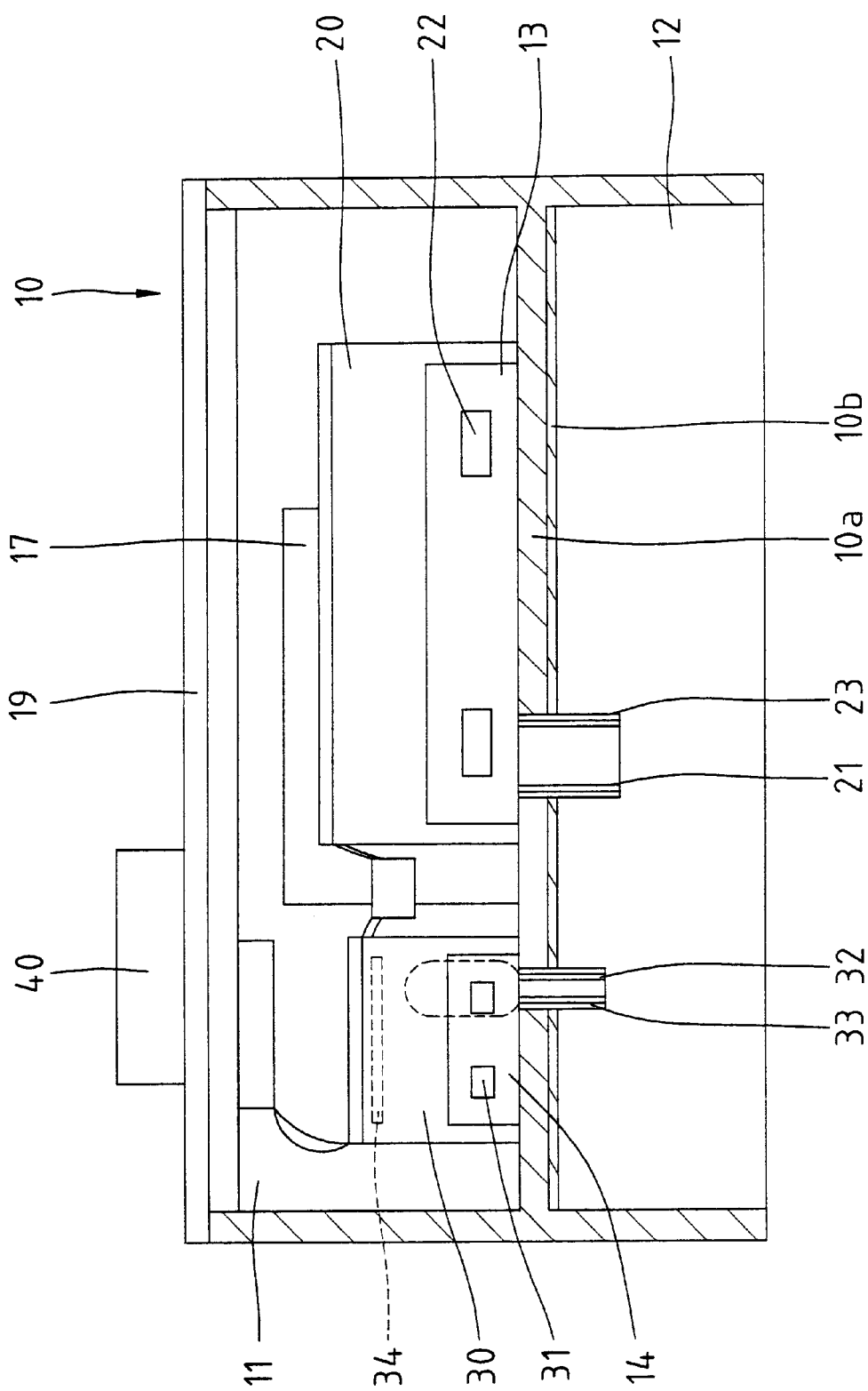
FIG. 3 is a sectional view of the depression cap for a bottle in accordance with the present invention.

Referring to FIGS. 1 through 3, a depression cap 10 in accordance with the present invention generally comprises a sealing plate 10a mounted in a middle thereof, thereby defining an upper compartment 11 in an upper end thereof and a lower compartment 12 in a lower end thereof for engaging with a nose (not labeled) of a bottle 50 (FIG. 4) such as a wine bottle. A lid 19 is attached to the upper end of the depression cap 10 to cover the upper compartment 11. The sealing plate 10a also serves as a mounting plate to provide a base on which an air pump 20, a pressure-activated switch 30, and a battery unit 18 are mounted. In this embodiment, two parallel first walls 13, two parallel second walls 14, and a battery seat 17 are formed on top of the sealing plate 10a, i.e., in the upper compartment 11 of the depression cap 10, best shown in FIG. 2. Each first wall 13 includes, e.g., two slots 131 and each second wall 14 includes, e.g., two slots 141. The sealing plate 10a further includes a first through-hole 15 and a second through-hole 16 that are communicated with the lower compartment 12 of the depression cap 10, which will be described in detail later.

The air pump 20 includes an air duct 21 and two lateral sides each having, e.g., two engaging members 22 for engaging with the slots 131 of the associated wall 13, thereby securely mounting the air pump 20 into the upper compartment 11 of the depression cap 10. An airtight sleeve 23 is extended through the first through-hole 15 and the air duct 21 is mounted in the airtight sleeve 23 and thus communicated with the lower compartment 12, best shown in FIG. 3. Of course, an additional sealing plate 10b can be provided below the sealing plate 10a to assist in the sealing effect.

The pressure-activated switch 30 may be a differential type pressure transducer and comprise a control chip 34 and a sensor 32. The pressure-activated switch 30 includes two lateral sides each having, e.g., two engaging members 31 for engaging with the slots 141 of the associated wall 14, thereby mounting the pressure-activated switch 30 into the upper compartment 11 of the depression cap 10. An airtight sleeve 33 is extended through the second through-hole 16, and the sensor 32 is mounted in the airtight sleeve 33 and thus located below the sealing plate 10a, best shown in FIG. 3. The battery unit 18 is removably mounted to the battery seat 17 in the upper compartment 11 of the depression cap 10 for powering the pressure-activated switch 30 and the air pump 20.

Figure 4:
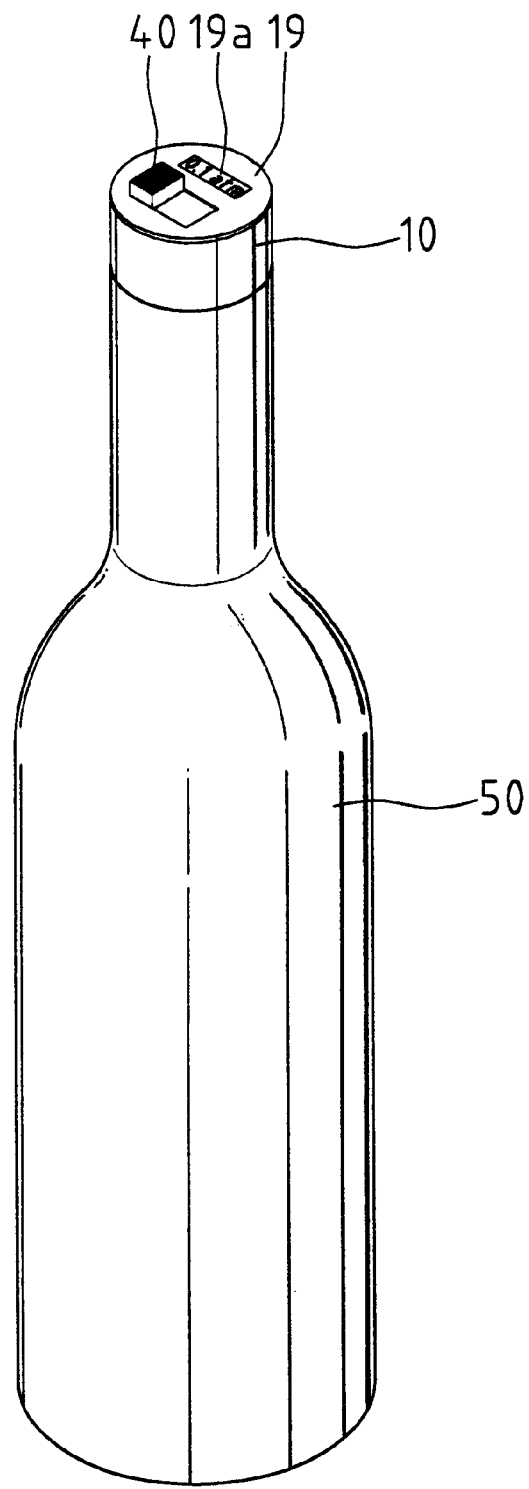
FIG. 4 is a perspective view illustrating use of the depression cap on a bottle.

The pressure transducer 30 (i.e., the pressure activated switch) outputs a voltage in response a difference between a reference pressure (e.g., the atmosphere) and a detected internal pressure in the lower compartment 12 of the depression cap 10, i.e., the internal pressure of the bottle 50 (FIG. 4). Namely, the output voltage of the pressure transducer 30 is in linear proportion to the pressure difference. In this embodiment, the output voltage is 3.3V if the detected internal pressure is equal to or above a first threshold pressure value (e.g., 1.15 atm); the output voltage is 1.2V if the detected internal pressure is equal to or below a second threshold pressure value (e.g., 1.0 atm); and the output voltage is 1.5V if the detected internal pressure is equal to or above a third threshold pressure value (e.g., 0.25 atm).

The control chip 34 has a set of controlling programs recorded therein and includes a first logic control mode and a second logic control mode switchable by a switch 40. When in the first logic control mode, the air pump 20 is activated when the output voltage of the pressure transducer 30 is higher than or equal to 3.3V, and the air pump 20 is turned off when the output voltage of the pressure transducer 30 is lower than or equal to 1.2V. When in the second logic control mode, the air pump 20 is activated when the output voltage of the pressure transducer 30 is higher than or equal to 1.5V, and the air pump 20 is turned off when the output voltage of the pressure transducer 30 is lower than or equal to 1.2V.

Figure 5:
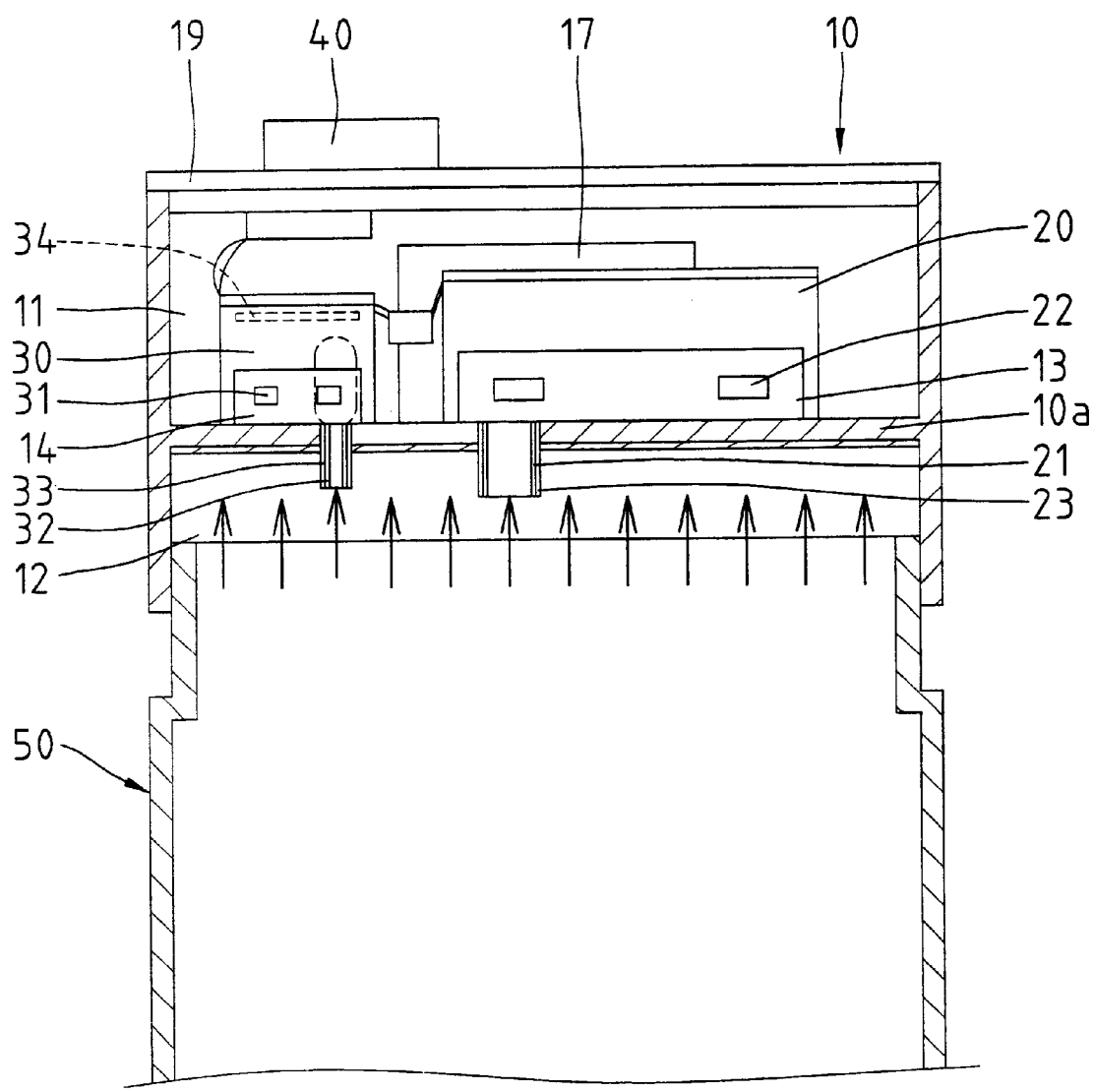
FIG. 5 is a sectional view similar to FIG. 3, illustrating operation of the depression cap upon closing of the depression cap.
Figure 6:
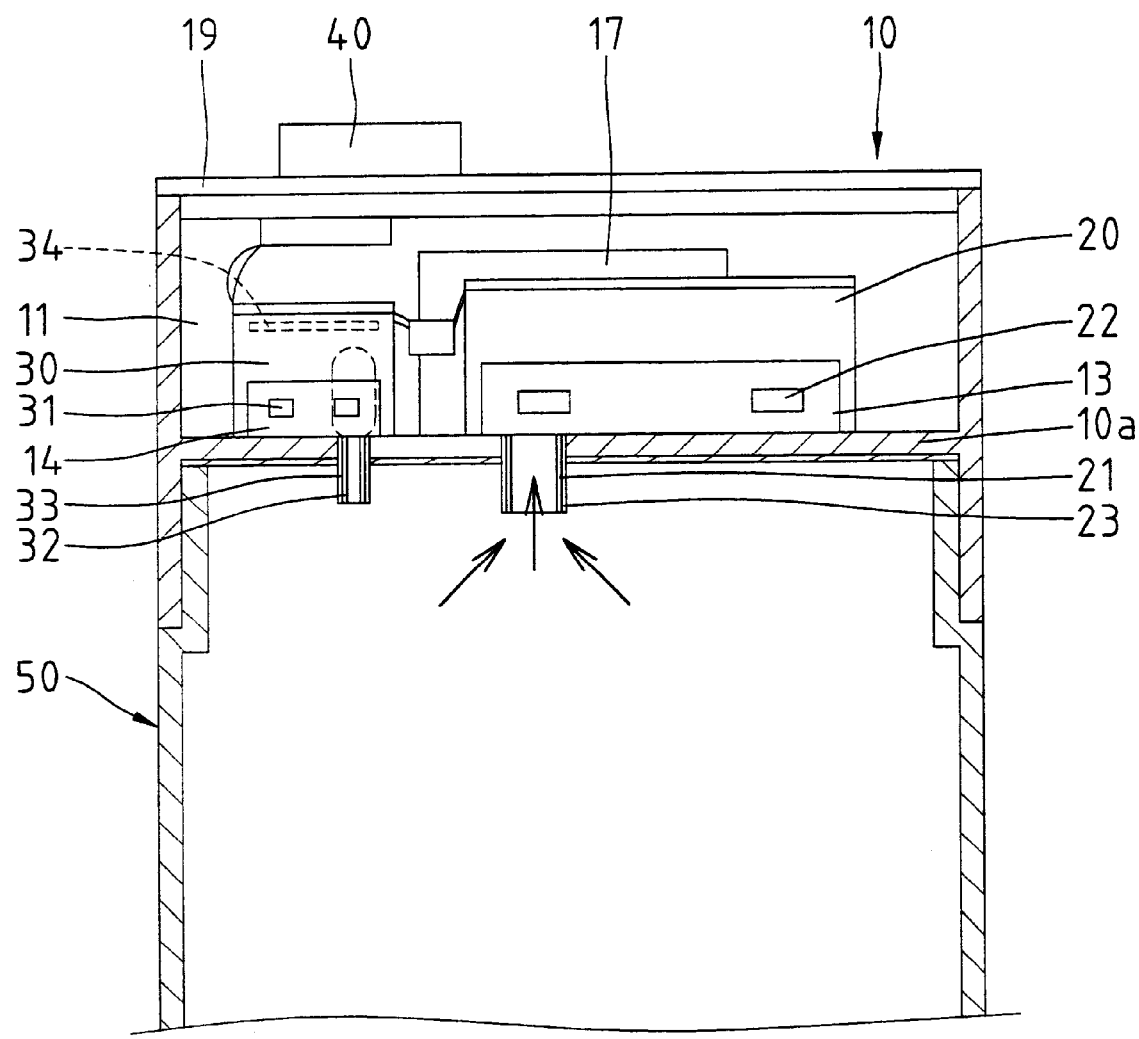
FIG. 6 is a sectional view similar to FIG. 5, wherein the depression cap is moved to its fully closed position.

In use, referring to FIG. 5, the switch 40 is firstly switched to the first logic control mode, and the depression cap 10 is attached to and thus encloses the nose of the bottle 50 (see FIG. 6). During closing of the depression cap 10 (i.e., the depression cap 10 is moved downward relative to the bottle 50), the air inside the lower compartment 12 of the depression cap 10 is compressed and thus generates an instant pressure greater than 1.15 atm. The pressure transducer 30 detects such a pressure and outputs a voltage higher than 3.3V. The air pump 20 is thus activated under the control of the control chip 34, thereby drawing air out of the bottle 50. The pressure in the bottle 50 is accordingly reduced. When the air pressure in the bottle 50 is equal to or below 0.1 atm, the output voltage of the pressure transducer 30 is lower than 1.2V. The air pump 20 is thus turned off.

The switch 40 is switched to the second logic control mode after depression. If the air pressure in the bottle 50 rises as a result of entrance of ambient air into the bottle 50, the sensor 32 detects the air pressure and the air pump 20 is turned on when the air pressure in the bottle 50 is equal to or above 0.25 atm upon outputting an output voltage higher than 1.5V. When the air pressure inside the bottle 50 is equal to or lower than 0.1 atm, the pressure transducer 30 outputs a voltage lower than 1.2V to turn off the air pump 20. Thus, the air pressure in the bottle 50 is kept at about 0.1 atm.

It is appreciated that the switch 40 and the first and second logic control modes can be simplified. For example, the first logic control mode is OFF and the second logic control mode is ON. More specifically, the pressure transducer 30 is turned on when in the second logic control mode and is turned off when in the first logic control mode. Thus, when in use, the user may attach the depression cap 10 to the nose of the bottle 50 and switch to the second logic control mode after the depression cap 10 is in position. The air pump 20 is turned on when the air pressure in the bottle 50 is equal to or above 0.25 atm and the air pump 20 is turned off when the air pressure in the bottle 50 is equal to or lower than 0.1 atm. A liquid display 19a may be provided on the lid 19 to display the internal pressure of the bottle 50.

Figure 7:
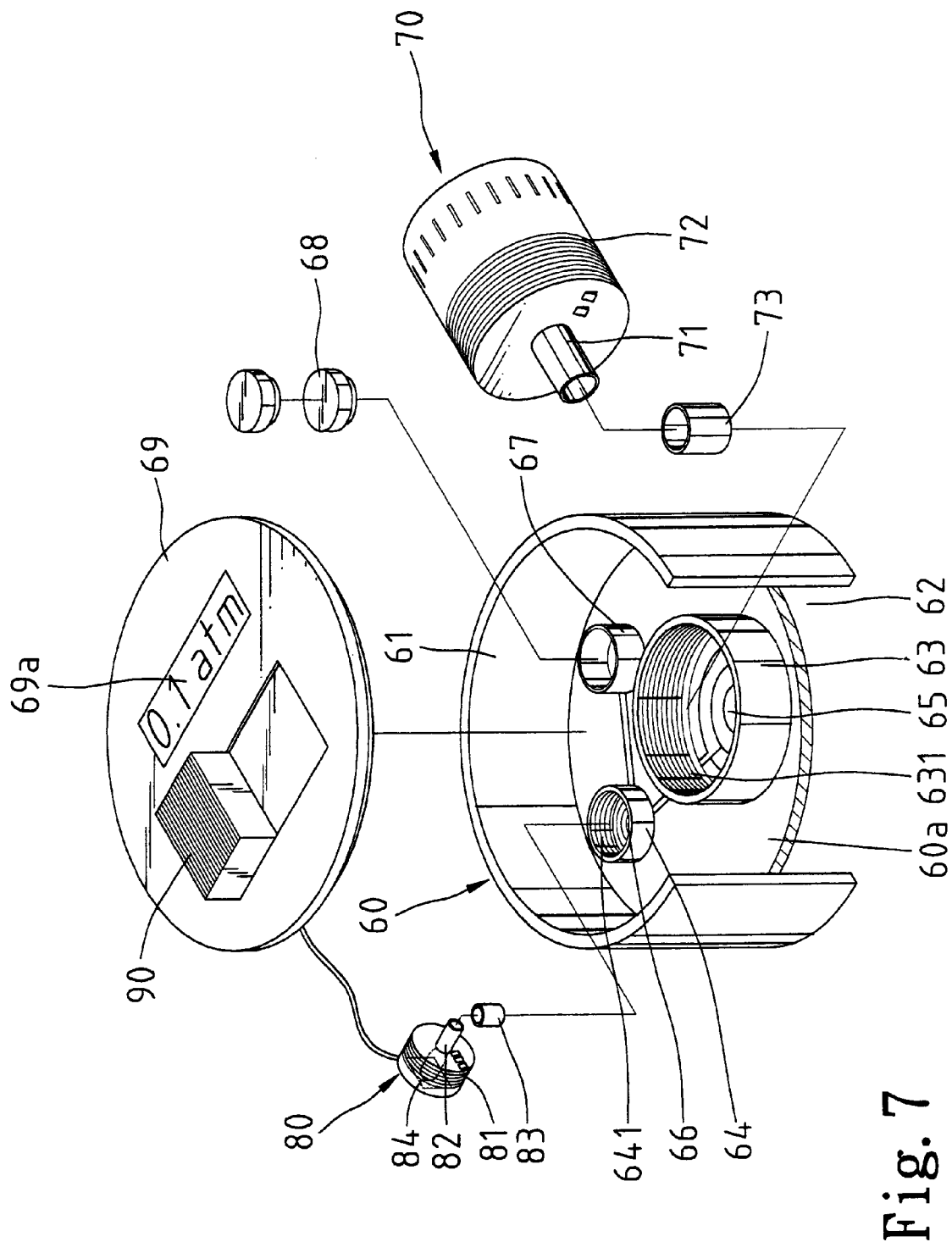
FIG. 7 is a perspective view illustrating a modified embodiment of the depression cap in accordance with the present invention.

FIG. 7 illustrates a modified embodiment of the depression cap in accordance with the present invention. The depression cap 60 comprises a sealing plate 60a mounted in a middle thereof, thereby defining an upper compartment 61 in an upper end thereof and a lower compartment 62 in a lower end thereof for engaging with a nose (not labeled) of a bottle such as a wine bottle. A lid 69 is attached to the upper end of the depression cap 60 to cover the upper compartment 61. The sealing plate 60a also serves as a mounting plate to provide a base on which an air pump 70, a pressure-activated switch 80, and a battery unit 88 are mounted.

In this embodiment, an annular battery seat 67, a first cylindrical wall 63, and a second cylindrical wall 64 are formed on top of the sealing plate 60a. The annular battery seat 67 defines a seat for receiving the battery unit 68. The sealing plate 60a further includes a first through-hole 65 surrounded by the first cylindrical wall 63 and a second through-hole 66 surrounded by the second cylindrical wall 64. The through-holes 65 and 66 are communicated with the lower compartment 62 of the depression cap 60.

The air pump 70 includes an air duct 71 and an outer threading 72 defined in an outer periphery thereof for engaging with an inner threading 631 of the first cylindrical wall 63, thereby securely mounting the air pump 70 in the first cylindrical wall 63. An airtight sleeve 73 is extended through the first through-hole 65 and the air duct 71 is mounted in the airtight sleeve 73 and thus communicated with the sealing plate 60a.

The pressure-activated switch 80 may be a differential type pressure transducer and comprises a control chip 84 and a sensor 82. The pressure-activated switch 80 includes an outer threading 81 in an outer periphery thereof for engaging with an inner threading 641 of the second cylindrical wall 64, thereby mounting the pressure-activated switch 7 in the second cylindrical wall 64. An airtight sleeve 83 is extended through the second through-hole 66, and the sensor 82 is mounted in the airtight sleeve 83 and thus located below the sealing plate 60a. A switch 90 and a liquid display 69a is provided on the lid 69, the operation of which is identical to that of the first embodiment.

The battery unit 68 is removably mounted to the battery seat 67 in the depression cap 60 for powering the pressure-activated switch 80 and the air pump 70. The sealing plate 60a further includes preserved passages allowing electrical connection between the battery seat 67 and terminals (not labeled) respectively on the pressure-activated switch 80 and the air pump 70. Operation of the modified embodiment is identical to that of the first embodiment illustrated in FIGS. 1 through 6.

Although the invention has been explained in relation to its preferred embodiment, it is to be understood that many other possible modifications and variations can be made without departing from the scope of the invention as hereinafter claimed.

What is claimed is:

1. A depression cap comprising:
   a first end and a second end, the second end having a compartment defined therein for engaging with a nose of a bottle;
   an air pump for drawing air out of the bottle; and
   a pressure-activated switch for controlling on/off of the air pump;
   the pressure-activated switch being capable of detecting an internal pressure in the bottle, the air pump being turned on when the internal pressure is higher than a predetermined first pressure value, the air pump being turned off when the internal pressure is lower than a predetermined second pressure value that is smaller than the predetermined first pressure value.

2. The depression cap as claimed in claim 1, further comprising a battery unit for powering the pressure-activated switch and the air pump.

3. The depression cap as claimed in claim 2, wherein the battery unit is removably mounted in the first end of the depression cap.

4. The depression cap as claimed in claim 1, wherein the pressure-activated switch and the air pump are mounted in the first end of the depression cap.

5. The depression cap as claimed in claim 4, further comprising a battery unit mounted in the first end of the depression cap for powering the pressure-activated switch and the air pump.

6. The depression cap as claimed in claim 1, further comprising a switch for controlling/off of the pressure-activated switch.

7. The depression cap as claimed in claim 1, further comprising a liquid display for displaying the internal pressure of the bottle.

8. A depression cap comprising:
  a first end and a second end, the second end having a compartment defined therein for engaging with a nose of a bottle;
  an air pump for drawing air out of the bottle; and
  a pressure-activated switch for controlling on/off of the air pump;
  the pressure-activated switch detecting a pressure difference resulting from a closing motion of the depression cap onto the nose of the bottle and turning the air pump on to thereby draw air out of the bottle, the air pump being turned off when an internal pressure in the bottle detected by the pressure-activated switch is lower than a predetermined pressure value.

9. The depression cap as claimed in claim 8, wherein the pressure-activated switch is a differential type pressure transducer and comprises a control chip and a sensor extended into the lower compartment of the depression cap for detecting the internal pressure in the bottle and outputting a voltage to the control chip in response to a difference between a reference pressure and the internal pressure detected by the sensor.

10. The depression cap as claimed in claim 9, wherein the reference pressure is the atmosphere pressure.

11. The depression cap as claimed in claim 8, further comprising a battery unit for powering the pressure-activated switch and the air pump.

12. The depression cap as claimed in claim 11, wherein the battery unit is removably mounted in the first end of the depression cap.

13. The depression cap as claimed in claim 8, wherein the pressure-activated switch and the air pump are mounted in the first end of the depression cap.

14. The depression cap as claimed in claim 13, further comprising a battery unit mounted in the first end of the depression cap for powering the pressure-activated switch and the air pump.

15. The depression cap as claimed in claim 8, further comprising a switch for controlling/off of the pressure-activated switch.

16. The depression cap as claimed in claim 15, wherein the depression cap comprises a sealing plate securely mounted therein for supporting the air pump and the pressure-activated switch, the sealing plate including a first through-hole and a second through-hole that are communicated with the compartment, a first airtight sleeve being extended through the first through-hole, an air duct extending from the air pump into the compartment via the first airtight sleeve, a second airtight sleeve being extended through the second through-hole, the sensor being extended into the compartment via the second airtight sleeve.

17. The depression cap as claimed in claim 16, wherein the sealing plate further comprises a first cylindrical wall surrounding the first through-hole and a second cylindrical wall surrounding the second through-hole, the first cylindrical wall including an inner threading, the air pump including an outer threading for threading engagement with the inner threading of the first cylindrical wall, the second cylindrical wall including an inner threading, the pressure-activated switch including an outer threading for threading engagement with the inner threading of the second cylindrical wall.

18. The depression cap as claimed in claim 8, further comprising a switch movable between a first position for automatic operation in which the air pump draws air out of the bottle upon the pressure difference generated as a result of the closing motion of the depression cap and a second position for manual operation in which the air pump is activated to draw air out of the compartment when the detected internal pressure in the bottle is higher than a predetermined second pressure value.

19. The depression cap as claimed in claim 8, further comprising a liquid display for displaying the internal pressure of the bottle.

* * * * *